(12) United States Patent
Briscese

(10) Patent No.: US 6,749,205 B2
(45) Date of Patent: Jun. 15, 2004

(54) VEHICLE WITH ADJUSTABLE HEIGHT WHEEL AND FENDER THEREFOR

(76) Inventor: Emanuele Briscese, Box 348, Notre Dame de Lourdes, Manitoba (CA), R0G 1M0

( * ) Notice: Subject to any disclaimer, the term of this patent is extended or adjusted under 35 U.S.C. 154(b) by 0 days.

(21) Appl. No.: 10/126,935

(22) Filed: Apr. 22, 2002

(65) Prior Publication Data

US 2002/0158443 A1 Oct. 31, 2002

Related U.S. Application Data

(63) Continuation-in-part of application No. 09/975,313, filed on Oct. 12, 2001, now Pat. No. 6,474,672, which is a continuation of application No. 09/369,378, filed on Aug. 6, 1999, now abandoned, which is a continuation-in-part of application No. 09/096,485, filed on Jun. 10, 1998, now abandoned.

(51) Int. Cl.$^7$ .............................................. B60G 11/26
(52) U.S. Cl. ...................................... 280/43.17; 293/44
(58) Field of Search ................................ 280/43, 43.11, 280/43.17, 43.23, 159, 160, 160.1; 293/34, 35, 36, 37, 44

(56) References Cited

U.S. PATENT DOCUMENTS

| | | |
|---|---|---|
| 2,478,795 A | 8/1949 | Whalen et al. |
| 2,566,393 A | 9/1951 | Wolfe |
| 2,766,050 A | 10/1956 | Stone |
| 2,807,381 A | 9/1957 | Tegeler |
| 3,062,558 A | 11/1962 | Krolicki |
| 3,557,980 A | 1/1971 | Klaus |
| 3,722,948 A | 3/1973 | Walsh et al. |
| 3,746,195 A | 7/1973 | Beilke et al. |
| 3,788,675 A | 1/1974 | Wilander |
| 3,807,593 A | 4/1974 | Bourton |
| 3,831,210 A | 8/1974 | Ow |
| 3,885,691 A | 5/1975 | Knapp |
| 4,058,325 A | 11/1977 | Schramm |
| 4,065,825 A | 1/1978 | Cohen |
| 4,098,347 A | 7/1978 | Honnold |
| 4,128,258 A | 12/1978 | Johnson |
| 4,168,932 A | 9/1979 | Clark |
| 4,317,593 A | 3/1982 | Sarvela |
| 4,415,300 A | 11/1983 | Boddicker |
| 4,475,760 A | 10/1984 | Morgan |
| 4,480,851 A | * 11/1984 | St-Pierre ..................... 280/656 |
| 4,490,089 A | 12/1984 | Welker |
| 4,595,210 A | 6/1986 | Groeing |
| 4,673,328 A | 6/1987 | Shiels |
| 4,711,499 A | 12/1987 | Fortin |
| 4,813,841 A | 3/1989 | Eischen |
| 4,854,805 A | 8/1989 | Althoff et al. |
| 5,161,814 A | 11/1992 | Walker |
| 5,354,090 A | 10/1994 | Grovom |
| 5,560,639 A | * 10/1996 | Nowell et al. ........... 280/6.151 |
| 5,743,541 A | * 4/1998 | Cook ....................... 280/43.13 |
| 6,135,700 A | 10/2000 | Collins |

FOREIGN PATENT DOCUMENTS

| | | |
|---|---|---|
| EP | 0199652 | 10/1985 |
| GB | 2043556 | 10/1980 |
| JP | 58/78836 | 5/1983 |

* cited by examiner

Primary Examiner—Kevin Hurley
(74) Attorney, Agent, or Firm—Adrian D. Battison; Michael R. Williams; Ryan W. Dupuis

(57) ABSTRACT

A vehicle arranged for raising and lowering the frame relative to the ground wheels for loading comprises a vehicle frame with a hitch at a forward end of the frame and at least two ground wheels for supporting the frame for movement across the ground. Each wheel has a mounting assembly providing driven rotation of a hub carrying the wheel spindle from a raised height of the wheel to a lower locked position. The hub is driven by a hydraulic motor driving a pinion. A fender is mounted on the vehicle frame for covering the wheel during transport, the fender including two interlocking portions thereof which are spring mounted so as to be movable relative to the wheel to accommodate the movement of the wheel to the raised position. The frame has a rear portion which is movable rearwardly to adjust the position of the load and the rear portion of the fender can be attached to the rear frame portion so as to be moved away from the wheel with movement thereof.

15 Claims, 12 Drawing Sheets

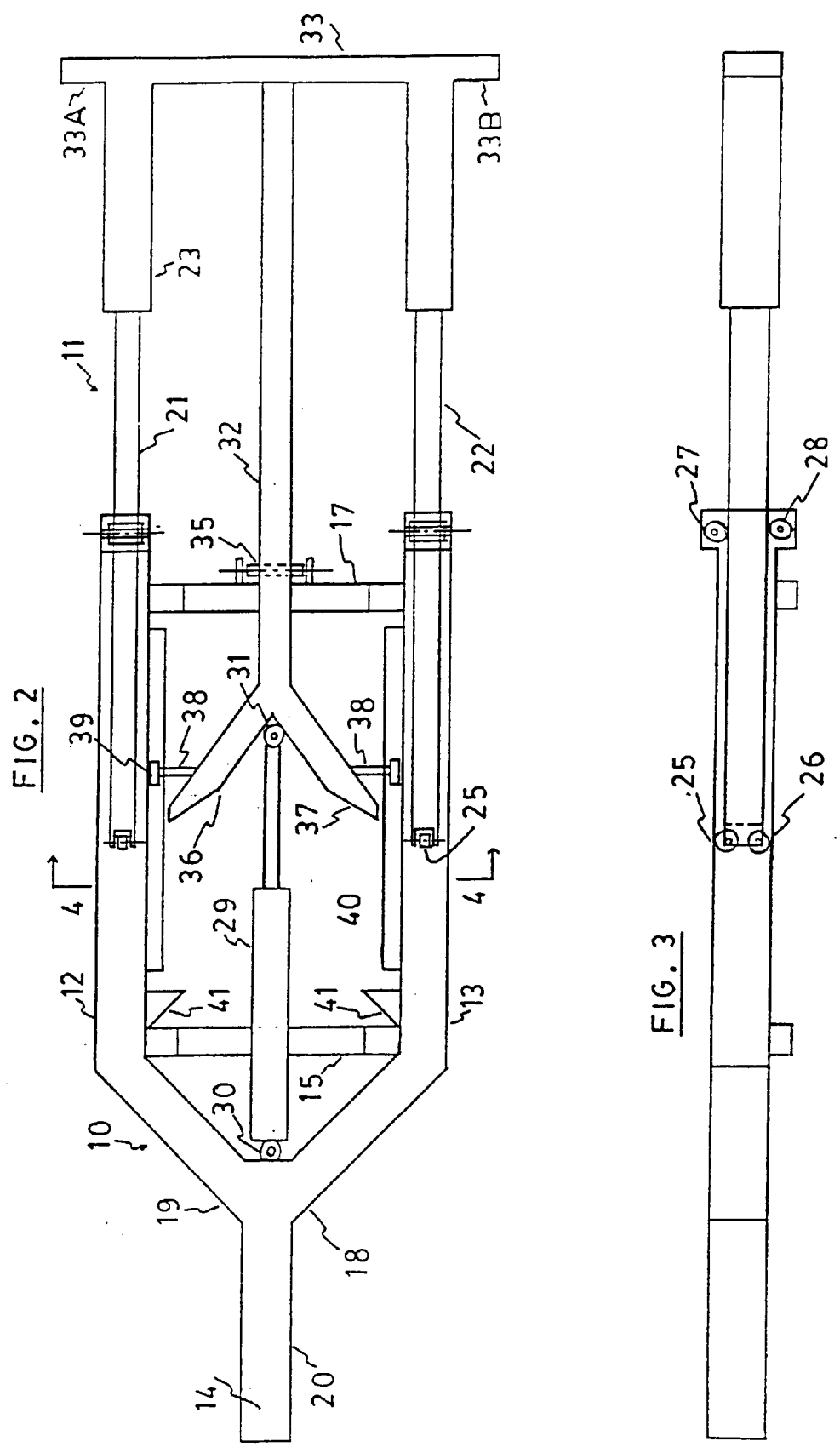

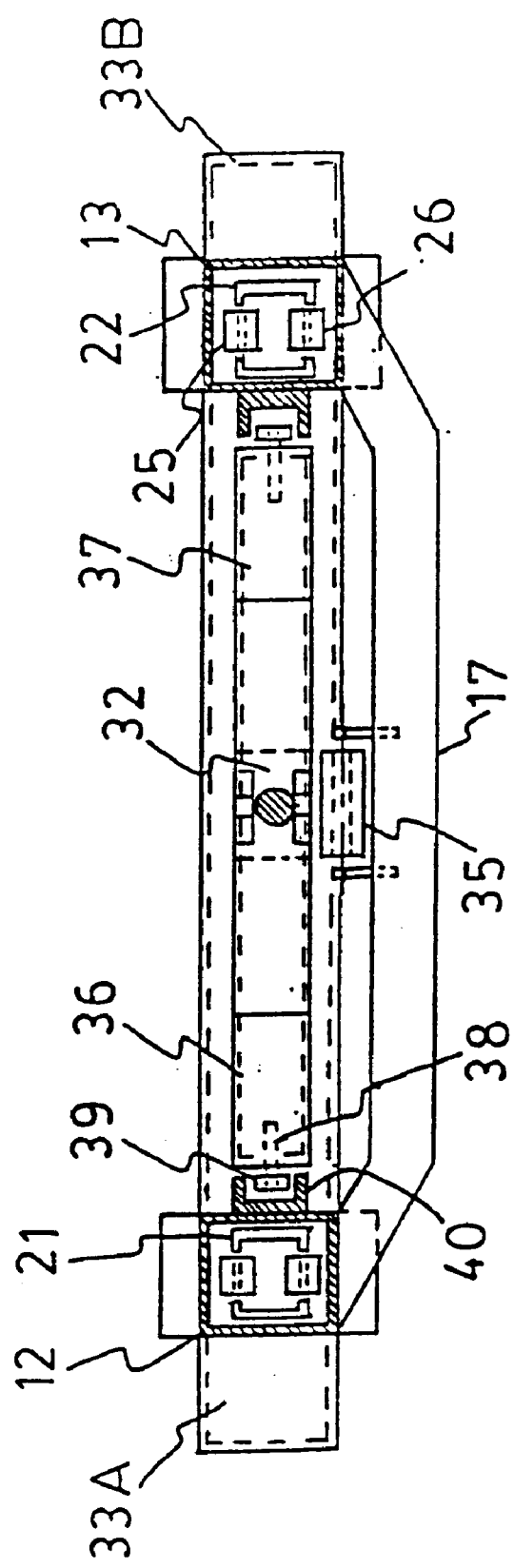

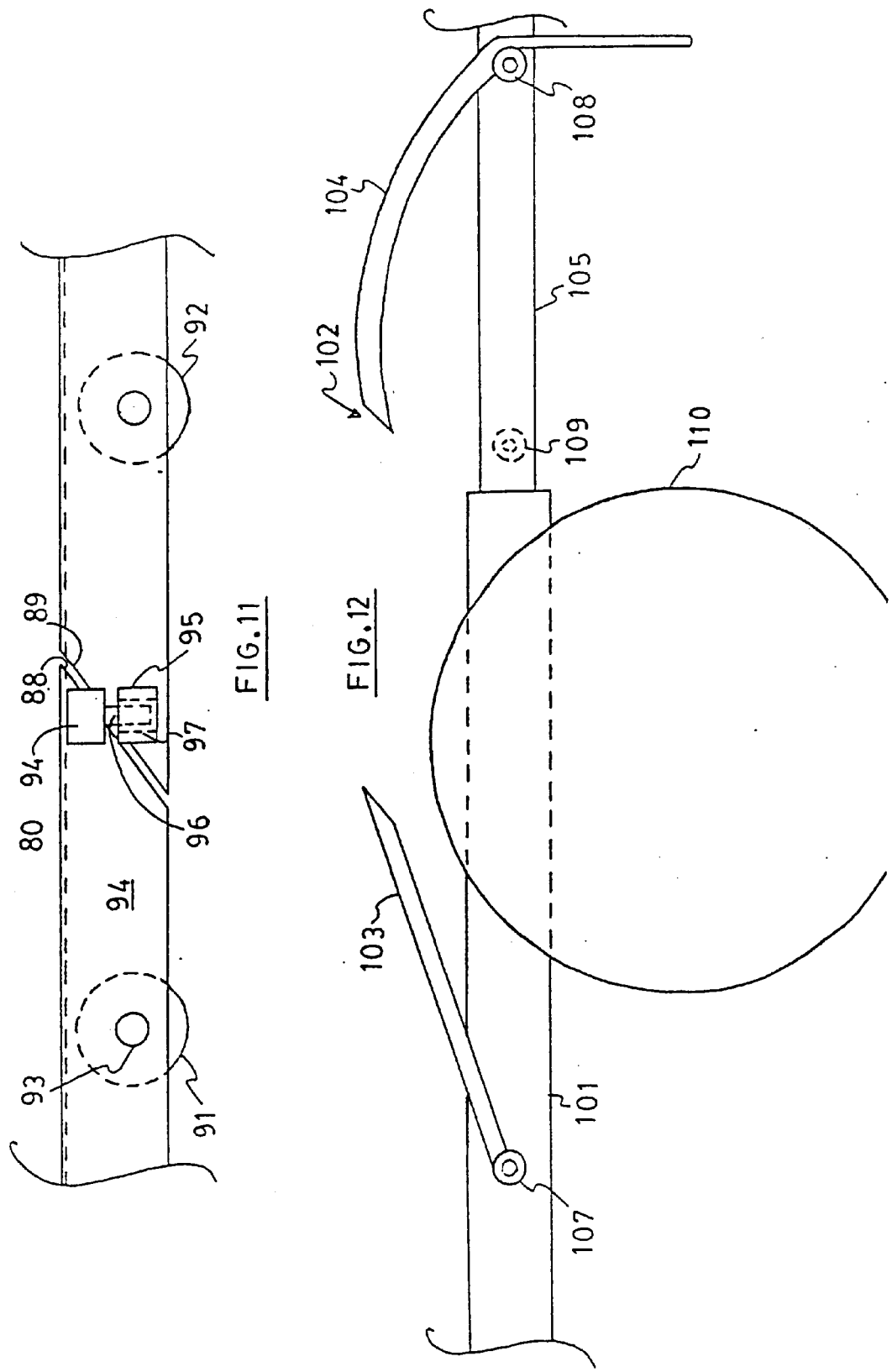

VEHICLE WITH ADJUSTABLE HEIGHT WHEEL AND FENDER THEREFOR

This application is a continuation-in-part of application Ser. No. 09/975,313 filed Oct. 12, 2001, now U.S. Pat. No. 6,474,672 which is a continuation of application Ser. No. 09/369,378 filed Aug. 6, 1999 (now abandoned) which is a continuation-in-part application of application Ser. No. 09/096,485 filed Jun. 10, 1998 abandoned.

This invention relates to an improved vehicle, which may be self propelled or a trailer, with ground wheels which raise and lower relative to a frame to allow a bed of the vehicle carrying a load to move upwardly and downwardly between loading and transport positions and to provide a fender for the wheel or wheels mounted on the frame which accommodates the movement of the wheels.

BACKGROUND OF THE INVENTION

Trailers which allow the wheels to be raised and lowered to lower and raise the trailer bed are well known. In many cases the trailer has no fenders so that the location and arrangement of the fenders is of no question. In other arrangements where a fender is provided, the fender is generally mounted on the same structure which carries the wheels for pivotal movement with the wheels so that the fenders can remain in the same close relationship to the wheel when raised for unloading and when lowered for transport. Examples are shown in U.S. Pat. No. 3,746,195 of Beilke issued Jul. 17, 1973, U.S. Pat. No. 4,065,825 of Cohen issued Jan. 3, 1978 and 4,711,499 of Fortin issued Dec. 8, 1987.

SUMMARY OF THE INVENTION

It is one object of the present invention to provide an improved vehicle with ground wheels which allow a bed of the vehicle carrying a load to move upwardly and downwardly between loading and transport positions and to provide a fender for the wheel or wheels which is movable to accommodate the movement of the wheels.

According to the invention there is provided a vehicle comprising;
 a vehicle structure including a frame;
 on each side of the frame there being provided at least one ground wheel with the wheels being attached to the frame by a mounting assembly for supporting the frame for movement across the ground;
 each ground wheel being mounted relative to the frame for movement of a wheel axis of the wheel from a first raised position of the wheel axis in which the frame is lowered to a position at or adjacent the ground to a second lowered transport position of the wheel axis in which the frame is raised for transport,
 on each side of the frame there being provided at least one fender mounted on the vehicle frame for covering the at least one wheel during transport;
 each fender being mounted on the frame such that raising and lowering of the respective wheel causes movement of the wheel relative to the fender;
 and each fender including at least a fender portion thereof which is mounted on the frame for pivotal movement relative to the frame to accommodate the movement of the wheels to the raised position.

Preferably the fender portion is mounted for pivotal movement about a generally horizontal axis to move from a lowered transport position when the wheel is in the transport position thereof upwardly with the wheel when contacted by the wheel.

Preferably the fender includes two fender portions divided at a line above the wheel each of which is mounted for pivotal movement about a respective pivot axis from the transport position.

Preferably the fender portions include a locking device for locking the two fender portions together in the transport position.

Preferably the two fender portions are spring biased into the transport position.

Preferably the two fender portions define a front portion pivotally mounted about an axis located in front of the wheel and a rear portion pivotally mounted about an axis located behind the wheel.

Preferably one or both of the fender portion includes a roller for engaging the wheel.

Preferably the vehicle structure is divided into a front portion and a rear portion, the rear portion being mounted relative to the front portion for forward and rearward sliding movement between a forward position and a rearward position and wherein the fender includes a first fender portion mounted on the front portion and a second fender portion mounted on the rear portion such that the second fender portion is movable with the rear portion to a position spaced away from the wheel to allow the upward movement of the wheel.

BRIEF DESCRIPTION OF THE DRAWINGS

One embodiment of the invention will now be described in conjunction with the accompanying drawings in which:

FIG. 2 is a top plan view of a center portion only of the frame of FIG. 1 showing the frame in an extended position.

FIG. 3 is a side elevational view of the frame portion of FIG. 2.

FIG. 4 is a cross sectional view along the lines 4—4 of FIG. 2.

FIG. 11 is a front elevational view of one part only of the fender of FIGS. 9 and 10 showing the fender in the normal locked operating position.

FIG. 12 is a front elevational view of a modified arrangement of the fender.

In the drawings like characters of reference indicate corresponding parts in the different figures.

DETAILED DESCRIPTION

The present invention relates generally to a vehicle which may be self propelled or may be designed as a trailer for attachment to a towing vehicle. The following description relates to a trailer which is a primary but not essential arrangement.

Figure 1:
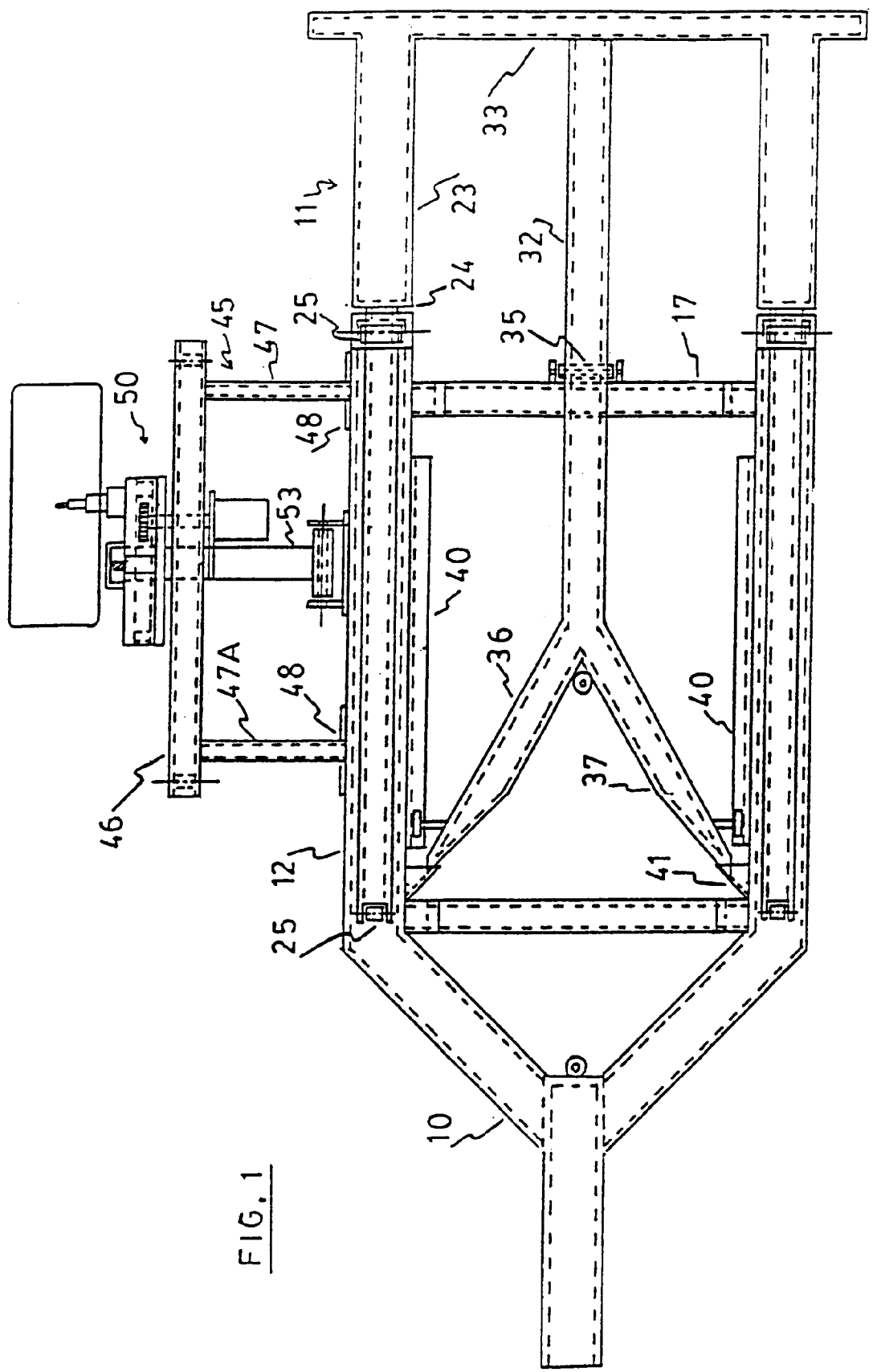
FIG. 1 is a top plan view of the vehicle according to the present invention with one side portion of the frame and the associated wheel thereon omitted for convenience of illustration.

The frame of the embodiment comprises a first frame portion 10 and a second frame portion 11 which can be adjusted from an inwardly closed shorter position shown in FIG. 1 to an extended position shown in FIG. 2.

The first frame portion 10 comprises a first beam 12 and a second beam 13 which are parallel and parallel to a direction of longitudinal movement of the trailer as indicated at 14. The beams 12 and 13 are indicated by a first transverse beam 15 and a second rear transverse beam 17. At the front of the beams 12 and 13 is provided a pair of inwardly inclined beam portions 18 and 19 which converge to a central apex at which is provided a hitch pole 20 extending forwardly from the frame for attachment to a towing vehicle.

The rear or second frame portion comprises a first load support beam 21 and a second load support beam 22. Each of first and second beams 21, 22 is formed of a first tubular portion 23 of the same dimensions as a tubular portion forming the beam 12,13 and a second tubular portion of reduced dimensions for sliding inside of the tubular portion defining the beam 12,13. Thus in the retracted position shown in FIG. 1, the end 24 of the portion 23 lies substantially immediately adjacent the end 25 of the beam 12. The beam 13 and the corresponding beam 22 of the second portion of the same construction.

At the forward end of the smaller beam portion of the rear frame is provided a pair of guide rollers 25, 26 which roll on the inside surfaces of the top and bottom wall of the beam 12,13 as best shown in FIG. 3.

At the rear end of the beams 12 and 13 is provided a pair of rollers 27, 28 which roll on the outside surface of the smaller portion of the beams 21, 22. Thus the smaller portions of the beam 21 and 22 are guided by the pair of rollers as best shown in FIG. 3 for sliding movement longitudinally of the beams 12,13.

The longitudinal sliding movement of the rear portion 11 or of the front portion 12 is then effected by a cylinder schematically indicated at 29 which is connected between a coupling 30 at the rear end of the hitch pole 20 and a coupling 31 on the rear frame portion 11.

The rear frame 11 further includes a third load support beam 32 parallel to and coplanar with the beams 21 and 22. The three beams are connected by a transverse rear beam 33 defining a rear part of the frame with the rear beam extending outwardly beyond the beams 21 and 22 to form projecting portions 33A and 33B. The third load support beam 32 rides on a roller 35 carried on a rear upper part of the transverse beam 17. Forwardly of the roller 35, the load support beam 32 splits into two transverse members 36 and 37 which diverge outwardly in a Y-shape toward the beams 12 and 13. Adjacent the forward end of each of the transverse members is provided a horizontal shaft 38 each of which carries a roller 39 running within a channel guide track 40 mounted on an inwardly facing surface of the respective beam 12, 13. Thus the forward end of the third beam is guided by the tracks 40 and is supported against vertical movement relative to the front frame portion 10. The coupling 31 is located at the apex between the legs of the Y-shape.

In this way the rear portion of the frame can be moved from the position shown in FIG. 1 to the extended position shown in FIG. 2. During this movement the position of the beams of the frame are maintained in forward position so that the frame remains coplanar and is structurally sound. In the retracted position shown in FIG. 1, the pointed end of each of the transverse member 36, 37 engages into a triangular receptacle 41 carried on the inwardly facing surface of the beam 12,13.

The complete frame section is defined by the front portion 10 and the rear portion 11 is supplemented by a pair of side frame portion generally indicated at 45. The righthand frame as shown in FIG. 1 but the left hand frame is omitted for convenience of illustration. Each frame portion comprises a horizontal beam 46 which is supported on the respective beam 12, 13 of the front portion 10 by a pair of inclined support struts 47, 47A. Each of the struts 47, 47A is attached to a plate 48 at its inner end bolted or otherwise fastened to the outside surface of the beam 12. Thus the beam 46 is supported at a height raised from the horizontal plane of the main frame. The beam 46 is however rigidly attached to the main frame and remains in a fixed position relative thereto.

The frame thus constructed by a pair of wheel assemblies generally indicated at 50. Again the right hand wheel assembly is shown in FIG. 1 and the left hand wheel assembly is omitted for convenience of illustration. It will be appreciated that the frame portion 45 and the wheel 50 of the right is symmetrical relative to the same elements on the left hand side.

The wheel assembly 50 comprises a ground wheel 51, a wheel mounting assembly 52, a pivot arm 53 and a leaf spring 54.

The pivot arm 53 is pivotally connected by a bracket 55 attached to the beam 1 by a plate 56 intermediate the plate 48. The arm 53 can thus pivot upwardly and downwardly in a suspension movement of the wheel against the bias of the spring 54 attached to the beam 46 by couplings 54A.

Other types of suspension can be used depending upon requirements and the present invention is not limited to the particular type of suspension shown and described herein.

The arm 53 projects beyond its connection to the base of the leaf spring 54 and thus provides a support for the wheel mounting 52. The wheel mounting 52 comprised a first member 60 in the form of a substantially vertical plate welded or otherwise attached to an outer end 61 of the arm 53 and standing upwardly therefrom so the arm is attached to the bottom of the plate 60. The plate carries a spindle 62 projecting forwardly from the plate at a position directly above the arm and extending horizontally from the plate when the plate stands vertical. The angle of the plate varies during suspension movement.

The mounting assembly 52 further includes a hub 63 forming a second member of the mounting assembly which is movable relative to the first member. The hub 63 includes a central ring 64 mounted on the spindle 62 for rotation about a rotation axis 65 defined by the spindle 62. The hub 63 carries a spindle 66 for the wheel 51 defining a wheel axis 67 about which the wheel rotates on the spindle 66. The spindle 66 is located at a position spaced from the spindle 62 with the axes 65 and 67 substantially parallel.

The hub 63 includes and outer ring 68 surrounding the axis 65 with the outer ring including an inwardly facing gear 69. A pinion 70 is mounted on a shaft 71 extending through the plate 60 and carried thereby on suitable bearings. The shaft 71 is parallel to the axis 65 and drives the pinion in rotation about the axis of the shaft so as to drive the gear 69 in rotation around the axis 65. The shaft 71 is driven by a hydraulic motor 72 carried on a support plate 73 attached to the arm 53 of a position thereon spaced from the plate 60 and inwardly of the spring 54. The plate 73 is based by a triangular base 74.

Figure 5:
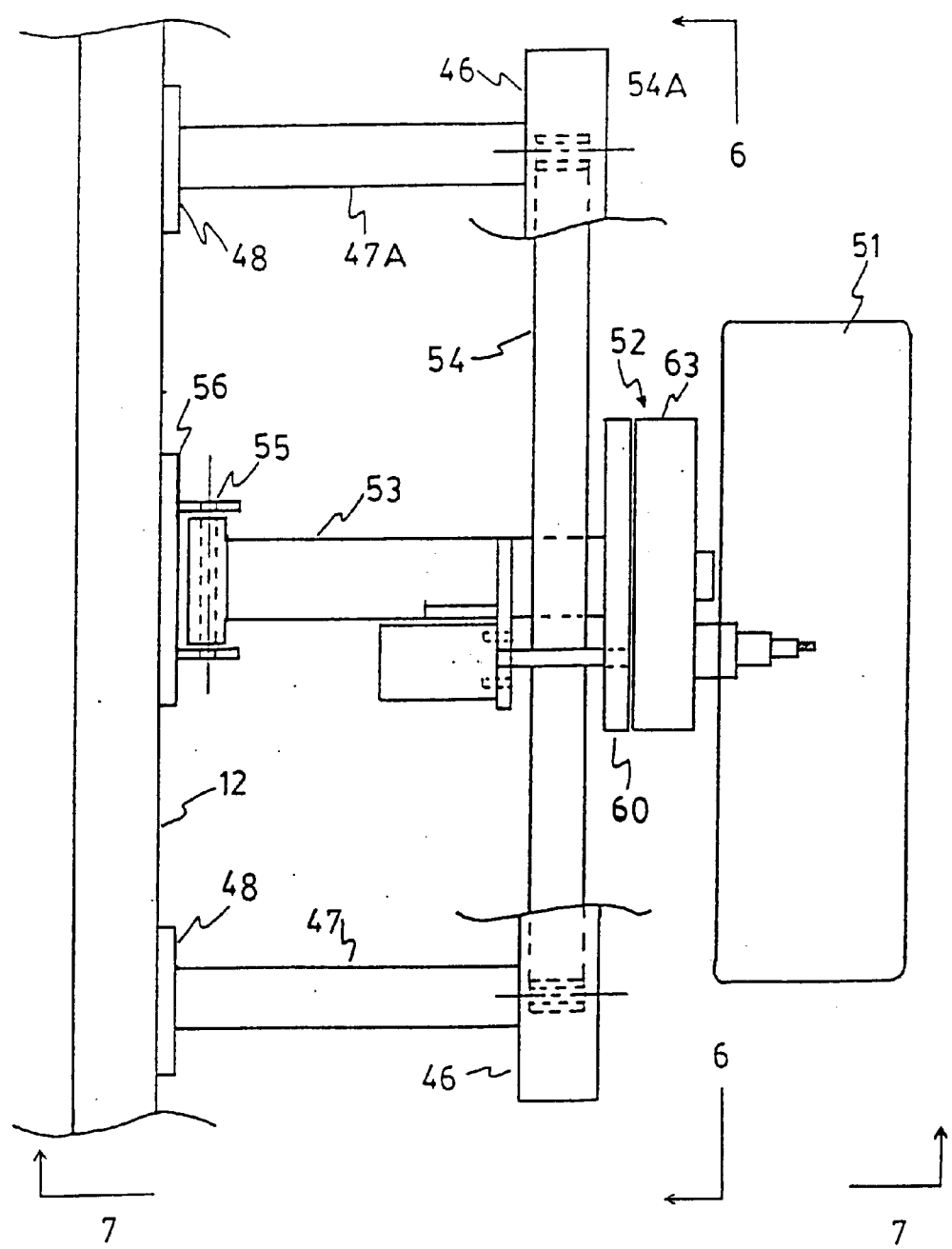
FIG. 5 is a top plan view, partly broken away, of the side portion only of the frame of FIG. 1 on an enlarged scale showing particularly the wheel mounting assembly.
Figure 6:
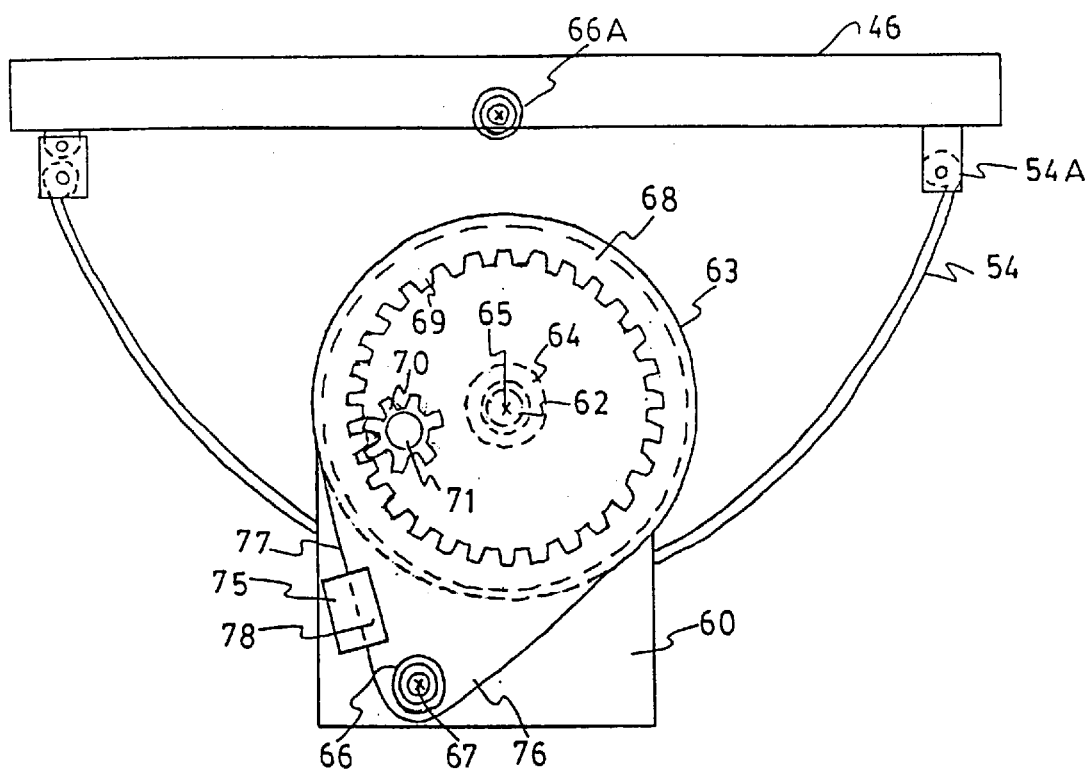
FIG. 6 is view along the lines 6—6 of FIG. 5.
Figure 7:
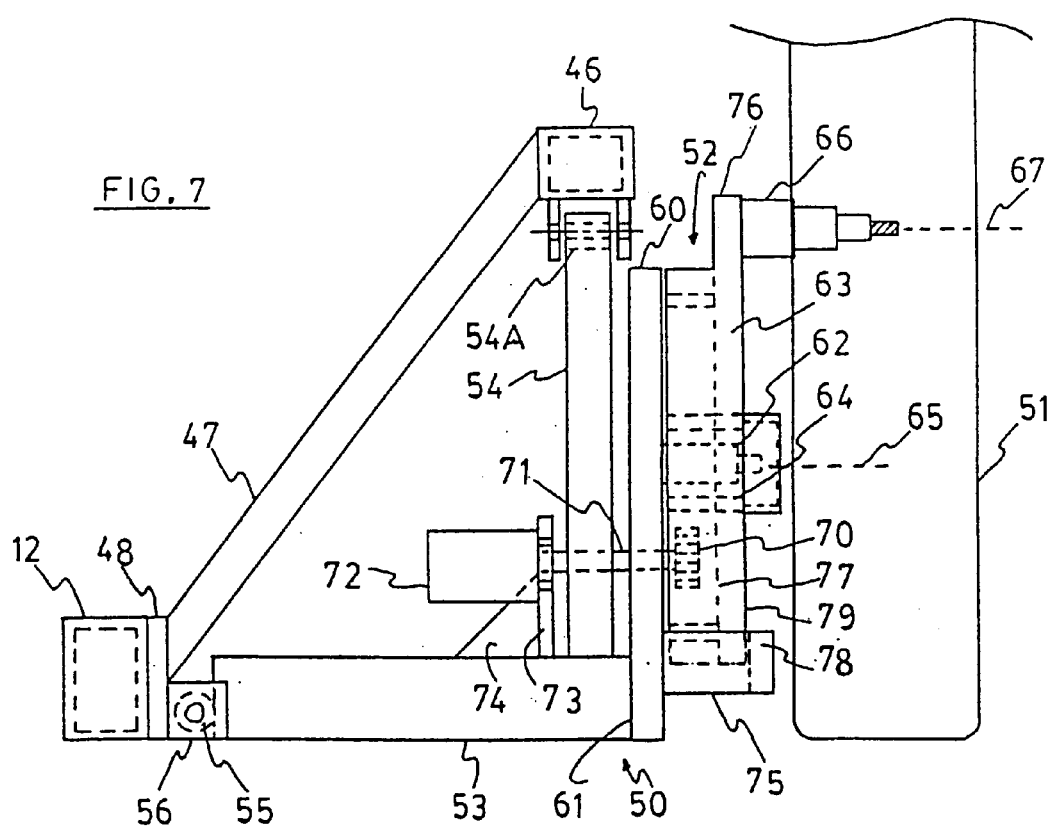
FIG. 7 is a view along the line 7—7 of FIG. 5 showing the wheel mounting assembly in the first raised position of the wheel axis.
Figure 8:
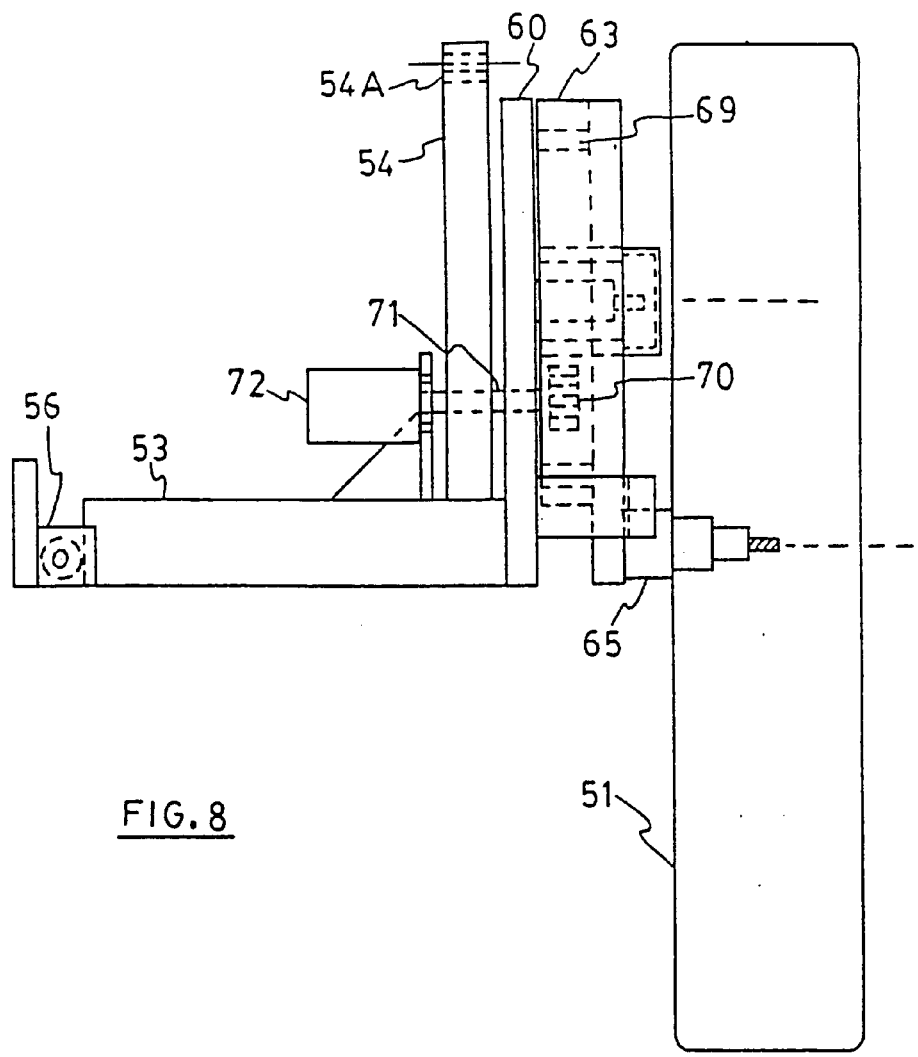
FIG. 8 is a view similar of FIG. 7 showing the mounting assembly in the second lowered position of the wheel axis.

Rotation of the shaft 71 effected by the hydraulic motor 72 thus causes the pinion to drive the hub 63 around the axis 65 from the first raised position of the spindle 66 as shown in FIG. 7 to the second lowered position of the spindle 66 as shown in FIGS. 5, 6 and 8.

In the raised position of the spindle 66 as shown in FIG. 7, the spindle is moved to a top center position directly above the axis 65. In this position the wheel 51 is raised relative to the frame. The wheel 51 has a diameter arranged such that in the raised position shown in FIG. 7 the frame is substantially at or adjacent ground height so that a load can be moved directly on to the trailer. The spindle 66 tends to center itself over the axis 65 due to the loading of the wheel on the hub 63 which tend to pull the hub upwardly in rotation relative to the plate 60.

When the trailer is loaded, the motor 72 is actuated to drive the shaft 71 causing the pinion to drive the gear in a direction to cause rotation of the hub 63 from the 12 o'clock position illustrated in dotted line at 66A in FIG. 6 to the 6:30 position shown in full line in FIG. 6. Thus the spindle 66 in the lowered position goes just beyond the bottom centered position that is slightly over-center until the hub 63 engages against a stop 75 carried on the plate 60. Thus the hub 63 includes a lobe 76 projecting outwardly to one side of the ring 68 with the lobe defining a side wall 77 which engages against the stop 75. The stop forms a surface which is oriented to engage the surface 77 when the lobe moves to the required position holding the spindle 66 at the 6:30 position.

In addition the stop 75 includes an end plate portion 78 projecting beyond a front face 79 of the hub 63. The end plate portion 78 defines a lip which is in sliding contact with the front face 79 so as to hold that front face against movement away from the plate 60. The lip 78 thus takes loading from the spindle 62 and insures that excessive loading on the spindle 66 tending to twist the bottom of the hub away from the plates 60 is resisted by the inter-engagement between the lip 78 and the surface 79.

The trailer therefore the present invention allows the frame of the trailer to be lowered to the ground for loading and the frame of the trailer to be lifted for transport. The lifting action is effected using hydraulic or electric action without operator involvement in latching or unlatching elements.

In addition rearward extension of a rear portion of the trailer relative to a forward portion acts to move the load rearwardly on the rear portion to a loading position, with the whole of the frame being movable in the vertical direction for the loading action.

Figure 9:
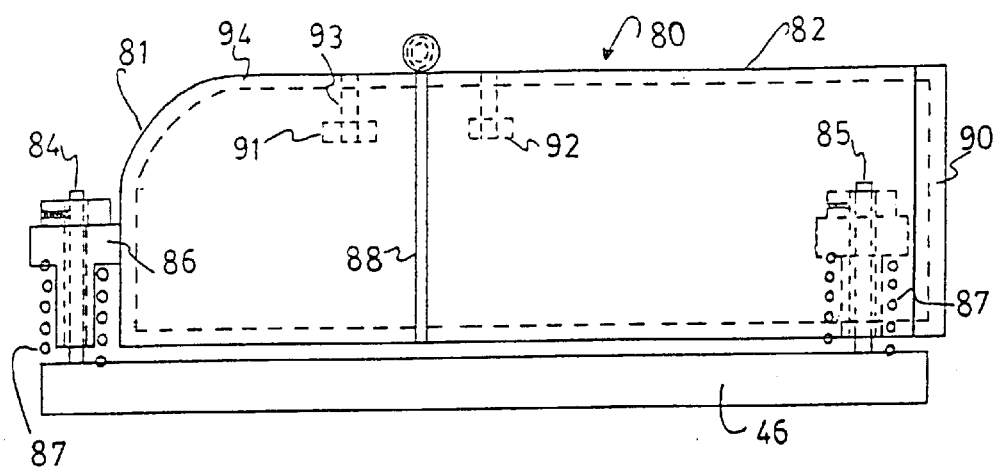
FIG. 9 is a top plan view of a wheel of the trailer of the above figures showing a fender for the wheel which is arranged to accommodate the lifting movement of the wheel.
Figure 10:
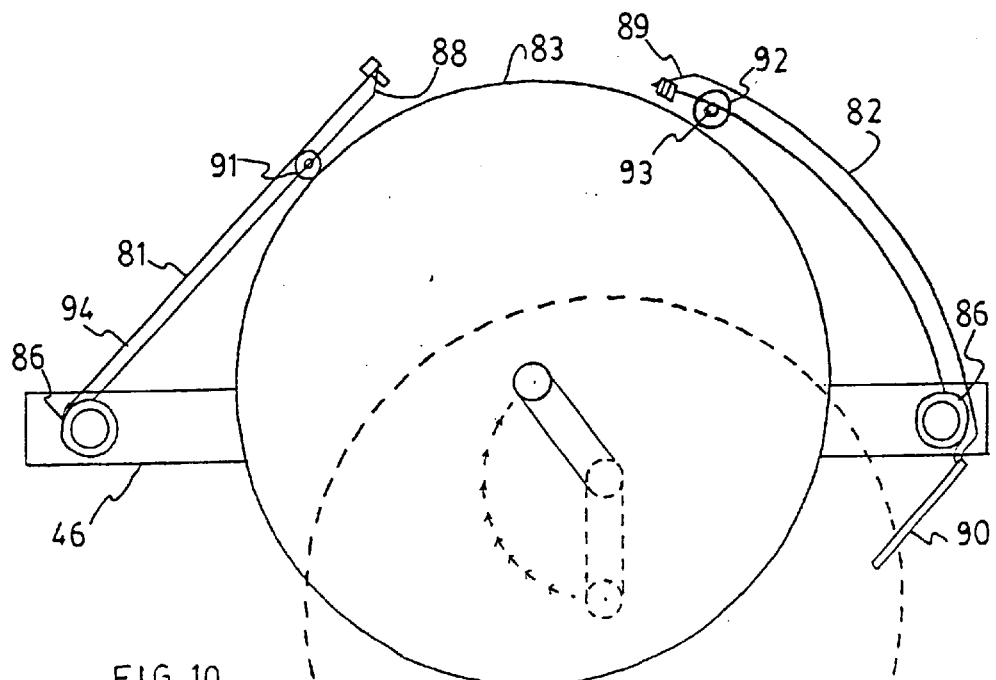
FIG. 10 is a front elevational view of the wheel and fender of FIG. 9 showing the fender in a raised position.

Turning now to FIGS. 9, 10 and 11 there is shown a fender for the trailer as shown and described above. During upward movement of the wheel for the lowering of the trailer frame to the ground, it is necessary for the fender to accommodate this upward movement. The normal position of the fender just above the wheel during transport movement of the trailer is necessary to prevent release of water, mud and other materials from the road and therefore in the normal position of the trailer, the fender is closely adjacent the wheel. When the wheel is raised, however, the fender must accommodate this movement.

One technique for accommodating movement is shown in FIGS. 9, 10 and 11 wherein there is provided a fender 80 forming two parts 81 and 82. The fender is mounted on the frame member 46 and projects outwardly therefrom over the wheel 83.

Each fender piece 81, 82 is mounted on a respective one of a pair of pins 84 and 85 mounted on and projecting outwardly from the frame member 46. Thus each fender piece 81, 82 includes a sleeve 86 surrounding the respective pin which is attached to the fender portion by any suitable technique such as welding. The sleeve 86 is arranged at the forward end of the portion 81 and at the rearward end of the portion 82. The sleeve can thus rotate around the pin allowing the fender portion to raise and lower as required. A spring 87 biases the fender portion into the lowered position.

The fender portion 81 is the forward portion and extends from the sleeve 86 on the pin 84 to a rearward edge 88 which is chamfered as indicated in FIG. 10.

The rearward portion 82 has a forward chamfered end 89 which matches the chamfered end 88 so that the end 88 rests over the end 89. The sleeve 86 of the portion 82 is arranged at the rearward end and behind the sleeve is provided a downwardly depending mud flap 90. Each portion carries a roller 91, 92 which contacts the peripheral surface of the wheel as the wheel is raised upwardly so as to push the portions upwardly as the wheel is raised. The roller is carried on a pin 93 projecting inwardly from an outer flange 94 of the fender.

The fender portions can be locked in place by a pair of locking members 94 and 95 mounted on one edge of the fender, which can be the inside edge, the outside edge or both edges, at the chamfered edges 88 and 89. The locking member 94 comprises an upper cap portion carrying a depending pin 96. The lower locking member 95 comprises a sleeve having an internal bore 97 into which the pin 96 seats. Thus locking members snap together in a self locking arrangement as the portions come together and are held together during normal operation so that the fender remains as a single unit during travel without a tendency of the rear part to open or lift or flap as the wind flows over the fender. At the time of raising the wheels, the front portion lifts first so that the pin 96 is pulled out of the rear portion to allow both fender portions to be pushed upwardly as shown in FIG. 10.

An alternative arrangement is shown in FIG. 12 where the side frame member 101 carries the fender generally indicated at 102 formed by two fender portions 103 and 104 substantially as previously described. In this embodiment the frame member 101 includes an extension portion 105 which slides inside the tubular frame member 101 so as to allow the frame member to extend. In this embodiment the front portion 103 is mounted on a sleeve and pin arrangement 107 as previously described. In this embodiment the rear portion 104 is fixed on a similar sleeve and pin arrangement as indicated at 108. The sleeve and pin 107 is mounted on the frame members 101. The sleeve and pin 108 is mounted on the frame member 105 and is therefore movable rearwardly as the frame is extended by pulling out the extension portion 105. The sleeve and pin arrangement 108 therefore moves from an initial position as shown at 109 in the normal operating position of the fender to an extended position as shown at 108. In this embodiment, therefore, instead of the rear portion pivoting upwardly on the spring, the rear portion remains at a fixed height but is instead moved horizontally away from the position of the wheel 110 allowing the wheel to move upwardly and providing a pushing action only on the forward portion 103.

The fender can also be designed for use with a dual or multi axle arrangement in which two or more wheels are arranged each behind the next. In this arrangement, the length of one or both portions of the fender is increased to accommodate the full area over the wheels. Alternatively a plurality of individual fenders are provided, one for each wheel.

Figure 13:
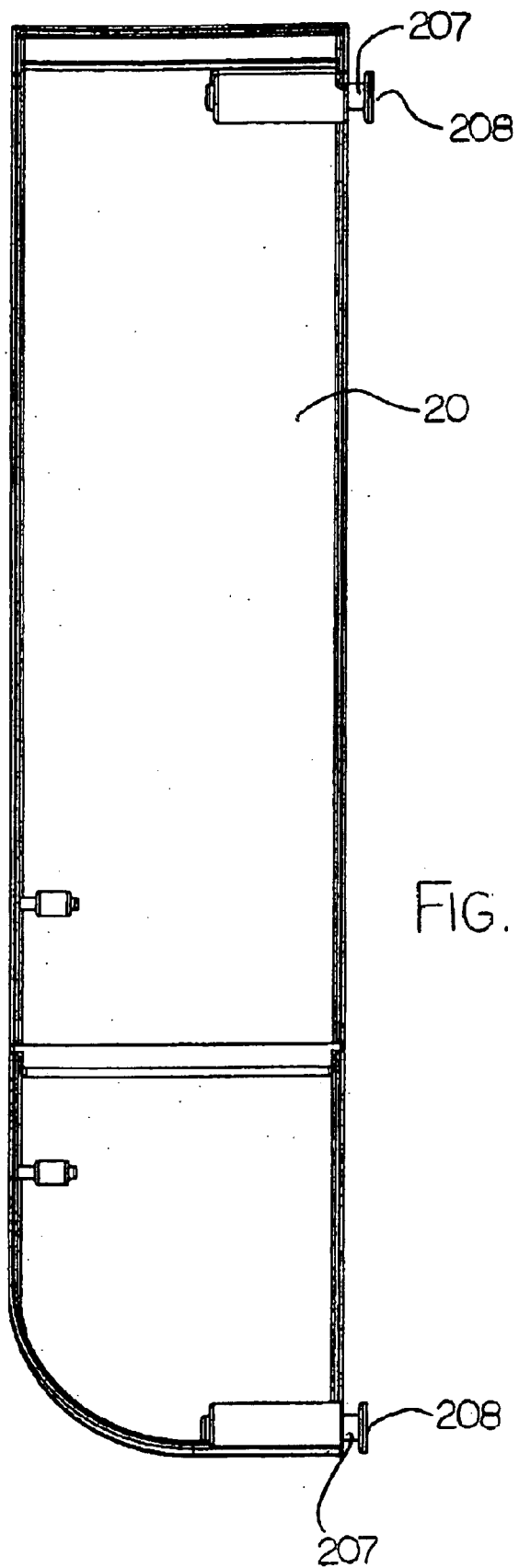
FIG. 13 is a top plan view of a further embodiment of fender for use with a trailer as shown in the above drawings.
Figure 14:
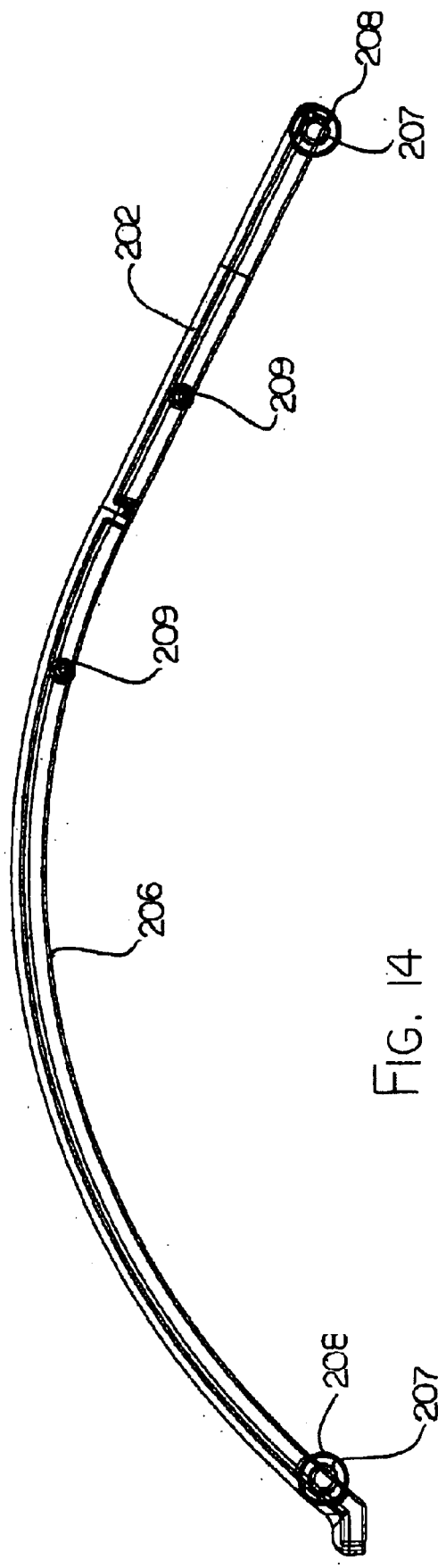
FIG. 14 is a side elevational view of the fender of FIG. 12.
Figure 15:
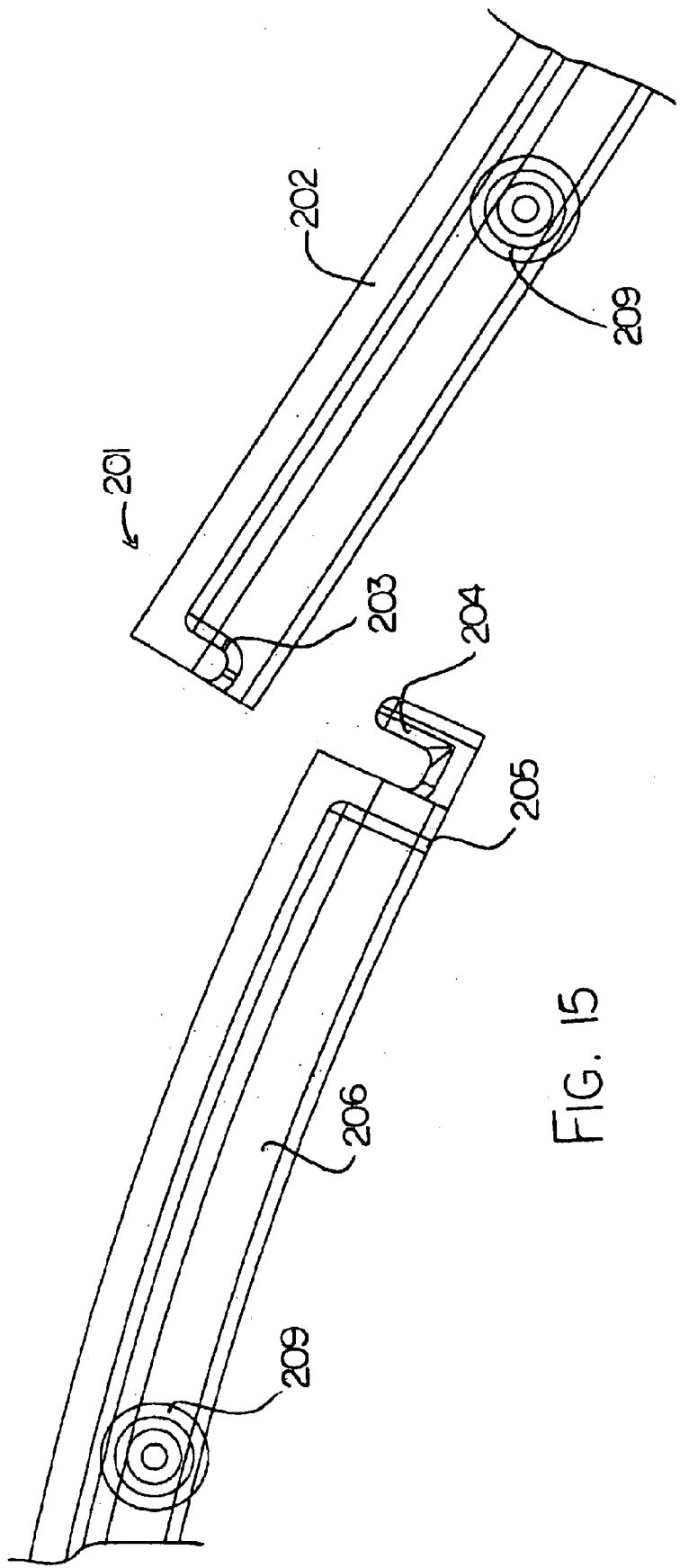
FIG. 15 is a side elevational view of the fender similar to FIG. 14 on an enlarged scale showing the self locking coupling between the front and rear parts.

In replacement for the pin locking arrangement described and shown above can be provided an alternative self locking arrangement shown in FIGS. 13, 14 and 15 in which the rear edge 201 of the front portion 202 includes a hooked curved section 203 an outer surface of which engages into a corresponding U-shaped receptacle 204 at the front edge 205 of the rear portion 206. These are arranged as set forth above with the receptacle on the rear section underneath the hook on the front section so that the rear section is held down against the tendency to lift in the air flow. Thus both front and rear sections are held down if lifted simultaneously but both are released if the front section is lifted first to an amount sufficient to allow the rear section to clear the front section. However when returning to the lowered position, the rear section drops first and then the hook on the front section drops into the receptacle on the rear section holding both locked together This self locking arrangement can be used with a single fender for a single wheel where the two portions meet over the wheel, with a single fender covering two or more wheels one in front of the other where the two portions meet between the wheels and in a double or triple fender arrangement where each of two or three wheels arranged one in front of the other are covered by their own individual fenders. As shown best in FIG. 13, each section is mounted for pivotal movement on a mounting pin 207 with a pin base 208 arranged for connection onto the outside surface of the trailer, the pins being arranged at the end of the section remote from the connection between the sections. The front section is shorter than the rear section. The front section is substantially flat or straight and the rear section is arched so that the connection between the sections is located in front of the uppermost apex. Each section carries a respective roller 209 for contacting the wheel as it raises. The rollers are arranged at substantially equal spacing forwardly of and rearwardly of the connection. This location and the shaping of the fender with the arch in the rear section causes the roller of the front section, which is lower than the roller of the rear section, to engage the wheel first so that the front section lifts first clearing the rear section and allowing the rear section to lift when its roller is engaged by the wheel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A vehicle comprising;

a vehicle structure including a frame;

on each side of the frame there being provided at least one ground wheel with the wheels being attached to the frame by a mounting assembly for supporting the frame for movement across the ground;

the vehicle being arranged such that, with the vehicle standing with the ground wheels on the ground, the height of the frame relative to the ground is movable from a lowered height at or adjacent the ground providing a loading position of the vehicle for loading of a load onto the vehicle to a raised height providing a transport position of the vehicle for transport of the load on the vehicle;

each ground wheel being mounted relative to the frame for movement of a wheel axis of the wheel, with the vehicle standing with the ground wheels on the ground, relative to the frame from a first raised position of the wheel axis in which the frame vehicle is lowered to the loading position to a second lowered position of the wheel axis in which the frame vehicle is raised to the transport position, on each side of the frame there being provided at least one fender mounted on the vehicle frame for covering the at least one wheel during transport;

each fender being mounted on the frame such that raising and lowering of the respective wheel relative to the frame causes movement of the wheel relative to the fender;

and each fender including at least a fender portion thereof which is mounted on the frame for pivotal movement relative to the frame to accommodate the movement of the at least one wheel relative to the frame to the raised position.

2. A vehicle comprising:

a vehicle structure including a frame;

on each side of the frame there being provided at least one ground wheel with the wheels being attached to the frame by a mounting assembly for supporting the frame for movement across the ground;

each ground wheel being mounted relative to the frame for movement of a wheel axis of the wheel from a first raised position of the wheel axis in which the frame is lowered to a position at or adjacent the ground to a second lowered transport position of the wheel axis in which the frame is raised for transport, on each side of the frame there being provided at least one fender mounted on the vehicle frame for covering the at least one wheel during transport;

each fender being mounted on the frame such that raising and lowering of the respective wheel causes movement of the wheel relative to the fender;

end each fender including at least two fender portions thereof each which is mounted on the frame for pivotal movement relative to the frame from a transport position to a raised position to accommodate the movement of the at least one wheel to the raised position;

wherein the two fender portions are divided at a line above the wheel and each is mounted for pivotal movement about a respective pivot axis at a respective end of the fender.

3. The vehicle according to claim 2 wherein the fender portions include a locking device for locking the two fender portions together in the transport position.

4. The vehicle according to claim 2 wherein the two fender portions are spring biased into the transport position.

5. The vehicle according to claim 2 wherein the two fender portions define a front portion pivotally mounted about an axis located in front of the wheel and a rear portion pivotally mounted about an axis located behind the wheel.

6. A vehicle comprising:

a vehicle structure including a frame;

on each side of the frame there being provided at least one ground wheel with the wheels being attached to the frame by a mounting assembly for supporting the frame for movement across the ground;

each ground wheel being mounted relative to the frame for movement of a wheel axis of the wheel from a first raised position of the wheel axis in which the frame is lowered to a position at or adjacent the ground to a second lowered transport position of the wheel axis in which the frame is raised for transport, on each side of the frame there being provided at least one fender mounted on the vehicle frame for covering the at least one wheel during transport;

each fender being mounted on the frame such that raising and lowering of the respective wheel causes movement of the wheel relative to the fender;

and each fender including at least one fender portion thereof which is mounted on the frame for pivotal movement relative to the frame from a transport position to a raised position to accommodate the movement of the at least one wheel to the raised position;

wherein the at least one fender portion includes a roller for engaging the wheel.

7. The vehicle according to claim 2 wherein each of the fender portions includes a roller for engaging the wheel.

8. The vehicle according to claim 2 wherein the front fender portion is arranged to be lifted first to release the rear fender portion to lift only when released by the front fender portion.

9. The vehicle according to claim 2 wherein the fender portions cover two wheels one in front of the other with the fender portions meeting between the wheels.

10. The vehicle according to claim 2 wherein the fender portions are self locking each to the other when lowered by lowering of the wheel axis.

11. A vehicle comprising:

a vehicle structure including a frame;

on each side of the frame there being provided at least one ground wheel with the wheels being attached to the frame by a mounting assembly for supporting the frame for movement across the ground;

each ground wheel being mounted relative to the frame for movement of a wheel axis of the wheel from a first raised position of the wheel axis in which the frame is lowered to a position at or adjacent the ground to a second lowered transport position of the wheel axis in which the frame is raised for transport, on each side of the frame there being provided at least one fender mounted on the vehicle frame for covering the at least one wheel during transport;

each fender being mounted on the frame such that raising and lowering of the respective wheel causes the movement of the wheel relative to the fender each fender including first fender portion and a second fender portion;

the first fender portion being mounted on the frame for pivotal movement relative to the frame from a transport position to a raised position to accommodate the movement of the at least one wheel to the raised position;

wherein the frame divided into a front portion and a rear portion, the rear portion of the frame being mounted relative to the front portion of the frame for forward and rearward sliding movement between a forward position and a rearward position;

and wherein the fender portion first fender portion is mounted on the front portion of the frame and a the second fender portion is mounted on the rear portion of the frame;

such that the second fender portion is movable with the rear portion of the frame to a position spaced away from the wheel to allow the upward movement of the wheel to the raised position.

12. The vehicle according to claim 11 wherein the first fender portion and the second fender portion meet at a position above the at least one wheel when the rear frame portion is in the forward position.

13. The vehicle according to claim 12 wherein the fender portions include a locking device for locking the two fender portions together in the transport position.

14. The vehicle according to claim 11 wherein at least the first fender portion is spring biased into the transport position.

15. The vehicle according to claim 11 wherein the first fender portion includes a roller for engaging the at least one wheel.

* * * * *